United States Patent
Rocamora et al.

(10) Patent No.: US 10,019,244 B1
(45) Date of Patent: Jul. 10, 2018

(54) INTERPRETING PROGRAM CODE USING A SYMBOL TABLE

(71) Applicant: Amazon Technologies, Inc., Seattle, WA (US)

(72) Inventors: David Ricardo Rocamora, Seattle, WA (US); Michael Joseph Ruiz, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/279,056

(22) Filed: Sep. 28, 2016

(51) Int. Cl.
*G06F 9/45* (2006.01)
*G06F 8/41* (2018.01)

(52) U.S. Cl.
CPC .................. *G06F 8/447* (2013.01)

(58) Field of Classification Search
CPC ....................................... G06F 8/447
USPC ................... 717/150–151, 137–146
See application file for complete search history.

(56) References Cited

U.S. PATENT DOCUMENTS

| | | | | |
|---|---|---|---|---|
| 5,335,344 A * | 8/1994 | Hastings | .................. | G06F 8/447 714/35 |
| 6,219,830 B1 * | 4/2001 | Eidt | .................... | G06F 9/44521 710/68 |
| 6,321,376 B1 * | 11/2001 | Willis | ....................... | G06F 8/10 717/124 |
| 6,408,432 B1 * | 6/2002 | Herrmann | ........... | G06F 17/5054 326/39 |
| 6,901,584 B2 * | 5/2005 | Shann | ..................... | G06F 8/447 717/136 |
| 6,973,644 B2 * | 12/2005 | Nylander | .................. | G06F 8/41 717/111 |
| 7,370,311 B1 * | 5/2008 | Pritchard | .............. | G06F 17/505 703/13 |
| 7,921,416 B2 * | 4/2011 | Fontoura | ............. | G06F 17/3041 707/623 |
| 7,984,429 B2 * | 7/2011 | Hunt | ...................... | G06F 9/465 717/130 |
| 8,091,076 B2 * | 1/2012 | Brown | ..................... | G06F 8/52 717/136 |
| 8,387,029 B2 * | 2/2013 | Bird | ........................ | G06F 8/427 717/139 |
| 8,464,234 B2 * | 6/2013 | Novillo | ..................... | G06F 8/42 717/140 |

(Continued)

OTHER PUBLICATIONS

Bernardeschi et al, "Decomposing Bytecode Verification by Abstract Interpretation", ACM Transactions on Programming Languages and Systems, vol. 31, No. 1, article 3, pp. 1-63, 2008.*

(Continued)

*Primary Examiner* — Anil Khatri
(74) *Attorney, Agent, or Firm* — Thorpe North & Western, LLP

(57) ABSTRACT

Technology is described for executing program code in a service provider environment. Program code to be interpreted in the service provider environment may be identified. A symbol may be detected in the program code during execution of the program code. A data store in the service provider environment may be accessed to fetch a value corresponding to the symbol in the program code. The data store may include a plurality of symbols and corresponding values. The program code may be interpreted using the value fetched from the data store.

19 Claims, 9 Drawing Sheets

(56) References Cited

U.S. PATENT DOCUMENTS

| | | | | |
|---|---|---|---|---|
| 8,799,877 B2* | 8/2014 | Cheriton | ............... | G06F 8/427 |
| | | | | 717/137 |
| 8,813,047 B2* | 8/2014 | Waddington | ............. | G06F 8/72 |
| | | | | 717/140 |
| 9,684,492 B2* | 6/2017 | Cawley | .................... | G06F 8/37 |

OTHER PUBLICATIONS

Tarau, "Integrated Symbol Table, Engine and Heap Memory Management in Multi-Engine Prolog", ACM, pp. 129-138, 2011.*

Koskimies et al, "FOOLS : A Unifying Approach to Object-Oriented Language Interpretation", ACM, pp. 153-164, 1987.*

Powell et al, "The Icewater Language and Interpreter", IEEE, pp. 98-102, 1984.*

Barany, "Python Interpreter Performance Deconstructed", ACM, pp. 1-6 , 2014.*

Provine et al, "Desymbol: An Interpretive Tool for Symbolic Logic", ACM, pp. 38-43, 2007.*

Holldobler et al, "Adaptable Symbol Table Management by Meta Modeling and Generation of Symbol Table Infrastructures", ACM, pp. 23-30, 2015.*

* cited by examiner

INTERPRETING PROGRAM CODE USING A SYMBOL TABLE

BACKGROUND

An interpreter is a computer program that directly executes instructions (e.g., on a processor) written in a high level programming or scripting language, without previously compiling the instructions into a machine language program. In one configuration, an interpreter may execute instructions (e.g., source code) by parsing the instructions and then directly converting the instructions to machine code to perform an associated behavior. In another configuration, an interpreter may translate instructions into an intermediate representation and then immediately execute the intermediate representation by converting the intermediate representation to machine code.

The interpreter may interpret instructions written in a wide variety of programming languages, such as LISP, Beginner's All-purpose Symbolic Instruction Code (BASIC), Java, C++, etc. An interpreter may differ from a compiler in that a computer program written in a high level language may be directly executed one statement at a time by the interpreter, whereas the compiler may convert an entire computer program into machine code for execution by a processor.

DETAILED DESCRIPTION

Figure 1:
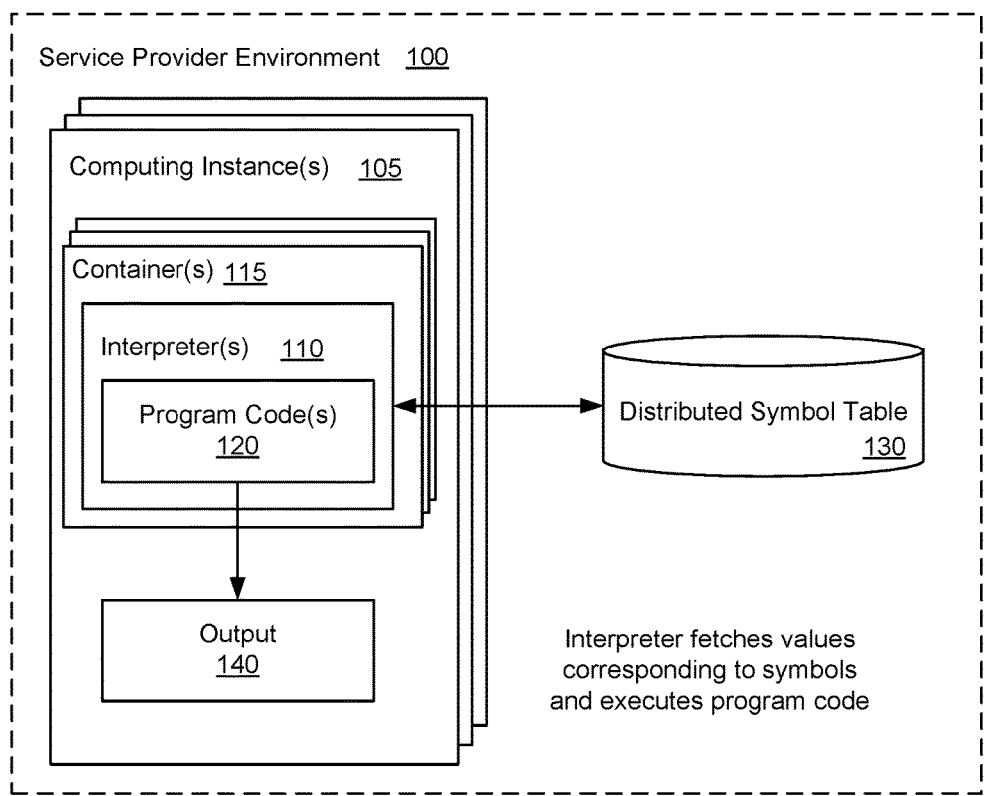
FIG. 1 illustrates a system and related operations for interpreting program code using a distributed symbol table according to an example of the present technology.

A technology is described for using an interpreter and a distributed symbol table to execute program code in a service provider environment. The interpreter may directly execute or perform instructions (e.g., source code) of a programming or scripting language using the distributed symbol table. The instructions may be written in a wide variety of programming languages, such as LISP, Perl, Python, Ruby, Beginner's All-purpose Symbolic Instruction Code (BASIC), Java, C, C++, etc. The interpreter may translate the program code to executable code for execution in the service provider environment.

In one example, an occurrence of a predefined event (e.g., a run program command or an execute command from a graphical interface control) may trigger an evaluation of the program code. During the evaluation of the program code, the interpreter may detect a symbol (or identifier) in the program code. The interpreter may access the distributed symbol table to fetch or obtain a value corresponding to the symbol in the program code. The value may include a string, a value, a binary value, a function, source code, a URI (uniform resource identifier), interpreted byte code or compiled code. The distributed symbol table may include a plurality of symbols and corresponding values. The distributed symbol table may be accessible to a plurality of program codes executing in the service provider environment. In other words, the distributed symbol table may be shared among multiple program codes executing in the service provider environment. In addition, the multiple program codes may execute in parallel (or substantially in parallel), and the multiple program codes may each access the same values from the distributed symbol table.

The interpreter may look up the symbol in the distributed symbol table, replace the symbol in the program code with the value fetched from the distributed symbol table, and then continue translating the program code to executable code. The interpreter may translate and execute the program code one statement at a time. In one example, the execution (or evaluation) of the program code may result in one or more actions being performed on a compute node with a dedicated hardware processor or on a computing resource in the service provider environment. In another example, the interpreter may generate an output upon execution of the program code. The ultimate program output produced by the interpreter may include various types of information, and the output may be provided to a client device, a requesting process, a requesting service, or to a user.

In one configuration, during the evaluation of the program code, a first interpreter may detect a symbol in the program code, and then access the distributed symbol table to fetch a value corresponding to the symbol in the program code. However, rather than evaluating the value fetched from the distributed symbol table at the first interpreter, the first interpreter may launch a second interpreter in the service provider environment to separately (e.g., remotely or locally) evaluate the value fetched from the distributed symbol table. A local evaluation of the value may be an evaluation that is performed using the first interpreter (i.e., the interpreter that initially evaluates the program code), whereas a remote evaluation of the value may be an evaluation that is performed using the second interpreter (i.e., an interpreter that is launched after the first interpreter begins to evaluate the program code). The second interpreter may execute in parallel to the first interpreter. The second interpreter may evaluate the value, and then return an output to the interpreter associated with the program code (i.e., a first interpreter). In one configuration, the second interpreter may perform a remote evaluation (or remote 'eval') since the evaluation of the value is performed remotely (e.g., using the second interpreter). Here, the value may be evaluated remotely by the second interpreter, as opposed to a local evaluation by the first interpreter (or local 'eval') in which the value may be fetched from the distributed symbol table and then evaluated locally at the first interpreter.

In one example, values included in the distributed symbol table may be updated by an operator or administrator. In another example, the distributed symbol table may be updated to include the output generated from the execution of the program code. The updated values and the output may be retrievable to a plurality of program codes that access the distributed symbol table during execution. Therefore, rather than manually updating the individual interpreter packages to reflect the updated values, the distributed symbol table may be updated to reflect the updated values and/or the output.

In one configuration, the distributed symbol table may be partitioned into one or more sections. Permission levels may be assigned to the plurality of program codes, such that each program code may be permitted to access one or more sections of the distributed symbol table in accordance with respective permission levels. For example, a first program code may be permitted to access a certain section of the distributed symbol table, whereas a second program code may be permitted to access the entire distributed symbol table.

Figure 2:
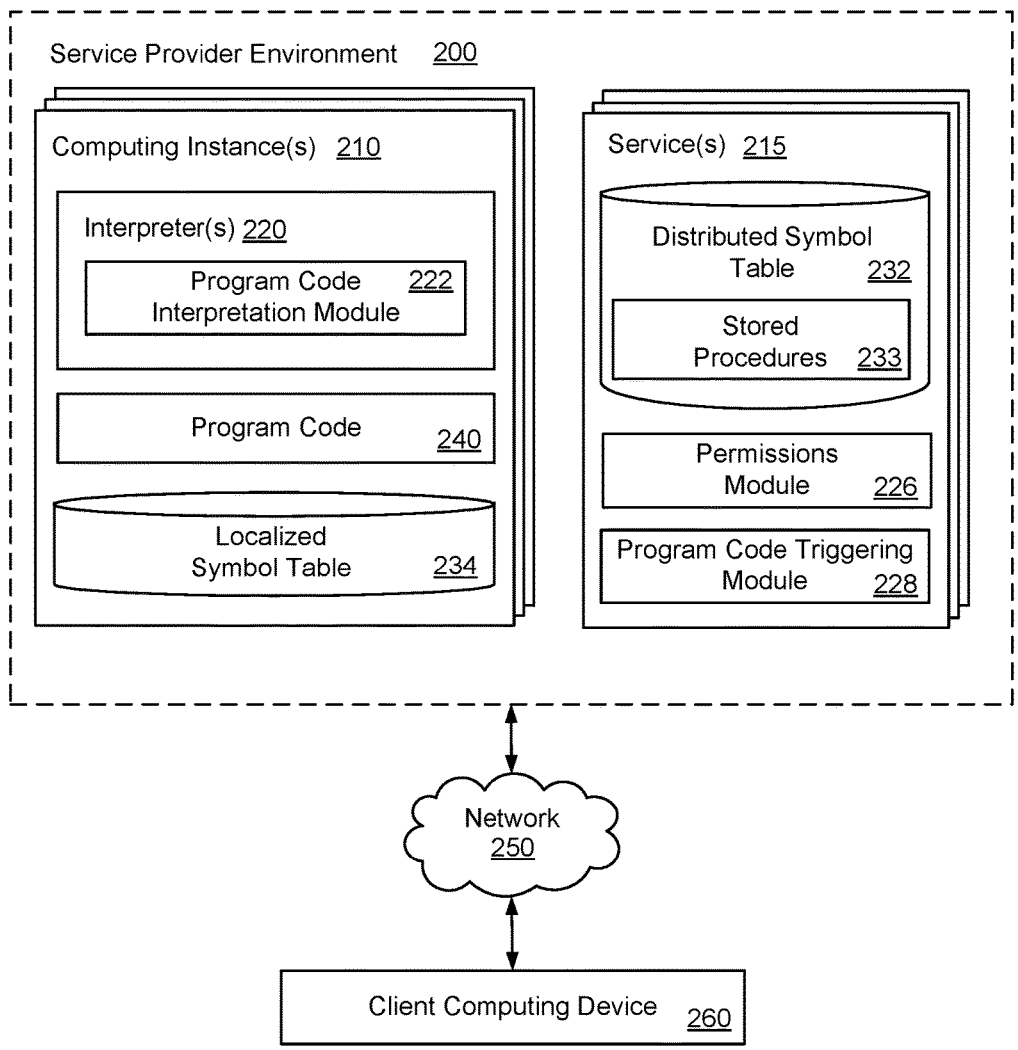
FIG. 2 is an illustration of a networked system according to an example of the present technology.

FIG. 1 illustrates an example of a system and related operations for interpreting program code 120 at an interpreter 110 in a service provider environment 100 using a distributed symbol table 130. The program code 120 may be a high level source code that is interpretable and executable. The program code 120 may include entire interpretable programs (e.g., including a main( ) function), independent functions or interpretable code snippets. The service provider environment 100 may run one or more computing instances 105 with containers 115 (e.g., for a virtualized operating system) within which an interpreter 110 may execute. The computing instances and containers may be part of a managed serverless compute service which are capable of executing the interpreter(s) as stateless program code functions that are managed by the service provider. In an alternative configuration, the interpreters 220 may execute on a computing instance 210 without a container (as illustrated in FIG. 2). In addition, the interpreter 110 may configure or set values in the distributed symbol table 130.

The interpreter 110 may identify the program code 120 to be executed in the service provider environment 100. The interpreter 110 may detect a symbol in the program code 120 during execution of the program code 120. The interpreter 110 may access the distributed symbol table 130 to fetch or obtain a value corresponding to the symbol in the program code 120. The distributed symbol table may include a plurality of symbols and corresponding values. The value fetched from the distributed symbol table 130 may include a string, an integer, a numeric value, a binary object, a function, source code, a URI (universal resource identifier), interpreted byte code, compiled code or another type of value for the symbol. The interpreter 110 may replace the symbol in the program code 120 with the value fetched from the distributed symbol table 130. The interpreter 110 may continue translating the program code 120 using the value fetched from the distributed symbol table 130, and the interpreter 110 may generate executable code. The interpreter 110 may execute the program code 120, and based on the execution of the program code 120, the interpreter 110 may generate an output 140. For example, the output 140 may include various types of information (e.g., data analysis, image processing, etc.). In some cases, the execution of the program code 120 may result in one or more actions being performed in the service provider environment 100 (e.g., generating trend data and storing the trend data in a data store).

In an alternative configuration, a compiler (not shown) may execute the program code 120 rather than the interpreter 110. For example, the compiler may detect the symbol in the program code 120 during execution of the program code 120. The compiler may access the distributed symbol table 130 to fetch the value corresponding to the symbol in the program code 120. The compiler may replace the symbol in the program code 120 with the value fetched from the distributed symbol table 130. The compiler may generate the executable code for later use.

In one configuration, four primitives may be utilized for evaluation of the program code. A first primitive may be 'define' or 'store', and this may be used to store a value for a corresponding symbol in the distributed symbol table. A second primitive may be 'reference', and this may be used to retrieve a value for a given symbol from the distributed symbol table. A third primitive may be 'evaluate', and this may be used to evaluate a value (e.g., a function) fetched from the distributed symbol table. A fourth primitive may be 'remote evaluate', and this may be used to remotely evaluate a value fetched from the distributed symbol table.

FIG. 2 illustrates components of an example service provider environment 200 according to one example of the present technology. The service provider environment 200 may operate a plurality of computing instances 210. A computing instance 210 may run an interpreter 220. The interpreter 220 may interpret program code 240 using a program code interpretation module 222. The computing instance 210 may include a localized symbol table 234 that is utilized by the interpreter 220 when interpreting the program code 240. In addition, the service provider environment may include a plurality of services 215 that may be hosted or may be resident on a plurality of virtual or physical servers managed by the service provider. The services 215 may include a distributed symbol table 234 stored on a data store service (e.g., a NoSQL data service) utilized by the interpreter 220 when interpreting the program code 240. The service provider environment 200 may be in communication with a client computing device 260 via a network 250.

In one example, the distributed symbol table 232 may be stored across the plurality of servers within a service 215 in the service provider environment 200, and the distributed symbol table 232 may be accessible to a plurality of program codes 240 being executed in the service provider environment 200. The distributed symbol table 232 may be utilized by the interpreter 220 during evaluation of the program codes 240. For example, the distributed symbol table 232 may include a plurality of symbols that may be included in the program codes 240, and for each symbol, the distributed symbol table 232 may include a corresponding value. The value may include a string, a numeric value, a function, source code, interpreted byte code, compiled code, etc. The value may include state information for a given system that operates in the service provider environment 200. The distributed symbol table 232 may be implemented as a linear list, a key value table, (e.g., an unsorted linear list or a sorted linear list), a binary search tree, a relational table, or a hash table. When the distributed symbol table 232 is implemented as a hash table, the symbols may be treated as keys for the hash function and the corresponding return values may be information about the symbols. The distributed symbol table 232 may maintain an entry for each symbol as follows: {symbol name, type of attribute, attribute}. In addition, the distributed symbol table 232 may store information on various entities such as variable names, function names, objects, classes, interfaces, etc. that may be included in the program codes 240.

In one example, the distributed symbol table 232 may include stored procedures 233. The stored procedures 233 may be subroutines that are available to the program codes 240 that access the distributed symbol table 232. The stored procedures 233 may be used for data validation or access control. The stored procedures 233 may consolidate and centralize logic that might otherwise be implemented in the program codes 240, such that the program codes 240 may call the stored procedures 233 that are maintained by the distributed symbol table 232. The stored procedures 233 may be implemented in a variety of programming languages, such as SQL, Java, C, C++, etc. The stored procedures 233 may accept input parameters and return values to the program codes 240.

As a non-limiting example, the distributed symbol table 232 may include a stored procedure 233 for maintaining a running average value (or 'avg' value) for a set of data. The distributed symbol table 232 may update the running average over a period of time as additional data is available (in the distributed symbol table 232 or in a separate data store table) for calculating the average. In this example, the distributed symbol table 232 may maintain a value called 'avg', and the value may dynamically change over the period of time. During an execution of program code 240, an interpreter 220 may detect a symbol that corresponds to the 'avg' value. The interpreter 220 may fetch the 'avg' value from the distributed symbol table 232. In this example, rather than the program code 240 calculating the average value, the distributed symbol table 232 may maintain the 'avg' value in accordance with the stored procedure 233, and the distributed symbol table 232 may return the 'avg' value when called by the program code 240.

In one example, the localized symbol table 234 may be locally stored on the computing instance 210 that runs the interpreter 220 that is interpreting the program code 240. In other words, the localized symbol table 234 may only be accessible to a particular program code 240 being executed in the service provider environment 200. The localized symbol table 234 may include values for symbols that are more frequently found in the program code 240. For each symbol, the localized symbol table 234 may include a corresponding value. The value may include a string, a numeric value, a function, source code, interpreted byte code, compiled code, etc. The localized symbol table 234 may be implemented as a linear list (e.g., an unsorted linear list or a sorted linear list), a key value table, relational tables, a binary search tree or a hash table. In addition, when the localized symbol table 234 is implemented as a hash table, the symbols may be treated as keys for the hash function and the corresponding return values may be information about the symbols.

The interpreter(s) 220 operating in the service provider environment 200 may include one or more modules for interpreting and executing the program code 240 in the service provider environment. For example, the interpreter(s) 220 may include a program code interpretation module 222, and other applications, services, processes, systems, engines, or functionality not discussed in detail herein.

The program code interpretation module 222 may be configured to identify program code 240 to be executed using the interpreter 220 in the service provider environment 200. The program code interpretation module 222 may detect a symbol in the program code 240 during execution of the program code 240. The program code interpretation module 222 may access the distributed symbol table 232 to fetch a value corresponding to the symbol in the program code 240. The value fetched from the distributed symbol table 232 may include a string, a numeric value, a function, source code, interpreted byte code or compiled code. The program code interpretation module 222 may replace the symbol in the program code 240 with the value fetched from the distributed symbol table 232. The program code interpretation module 222 may translate the program code 240 using the value fetched or obtained from the distributed symbol table 232 to executable code. The program code interpretation module 222 may execute (or evaluate) the program code 240 one statement at a time. In one example, the initiation of the execution of the program code 240 may result in one of more actions being performed in the service provider environment 200. In another example, the program code interpretation module 222 may generate an output when the program code 240 is executed in the service provider environment 200. The output may include various types of information, such as data analysis, image analysis, etc.

In one example, the services 215 may include a permissions module 226 configured to partition the distributed symbol table 232 into one or more sections. The permissions module 226 may assign permission levels to each of the program codes 240, such that each program code 240 may be permitted to access one or more sections of the distributed symbol table 232 in accordance with their respective permission levels. As a result, the distributed symbol table 232 may be accessible and shared among the plurality of program codes 240, but not all portions of the distributed symbol table 232 may be available to all of the program codes 240. As a non-limiting example, a first program code may be permitted to access a first section of the distributed symbol table 232, a second program code may be permitted to access a second section of the distributed symbol table 232, and a third program code may be permitted to access both the first section and the second section of the distributed symbol table 232.

In one example, the services 215 may include a program code triggering module 228 that initiates an execution (or an interpretation or evaluation) of the program code 240. For example, the program code 240 may be uploaded to the service provider environment 200, and an occurrence of a predefined event may cause the program code triggering module 228 to trigger an execution of the program code 240. In another example, the program code triggering module 228 may receive a user input (e.g., from the client computing device 260), and in response, the program code triggering module 228 may initiate the execution of the program code 240.

As a first non-limiting example, an execution of the program code 240 may be triggered when an image is uploaded to a data store. The program code 240 may run image resizing code to resize the image for viewing on different devices, such as desktop computers, tablets and smart phones. As a second non-limiting example, an execution of the program code 240 may be triggered when a social media data stream is uploaded to the service provider environment 200. The program code 240 may be executed to generate social media trend data for storage on the services 215, and the social media trend data may be available for query by business users. As a third non-limiting example, an execution of the program code 240 may be triggered when tractor sensors send data to the service provider environment 200. The program code 240 may be executed to detect trends in sensor data, identify anomalies and order replacements for faulty parts.

The client computing device 260 may comprise a computer system that is embodied in the form of a desktop computer, a laptop computer, mobile devices, cellular telephones, smartphones, set-top boxes, network-enabled televisions, tablet computer systems, or other devices with like capability.

The various processes and/or other functionality contained within the service provider environment 200 may be executed on one or more processors that are in communication with one or more memory modules. The service provider environment 200 may include a number of computing devices that are arranged, for example, in one or more server banks or computer banks or other arrangements. The computing devices may support a computing environment using hypervisors, virtual machine managers (VMMs) and other virtualization software.

The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

The network 250 may include any useful computing network, including an intranet, the Internet, a localized network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting.

Figure 3:
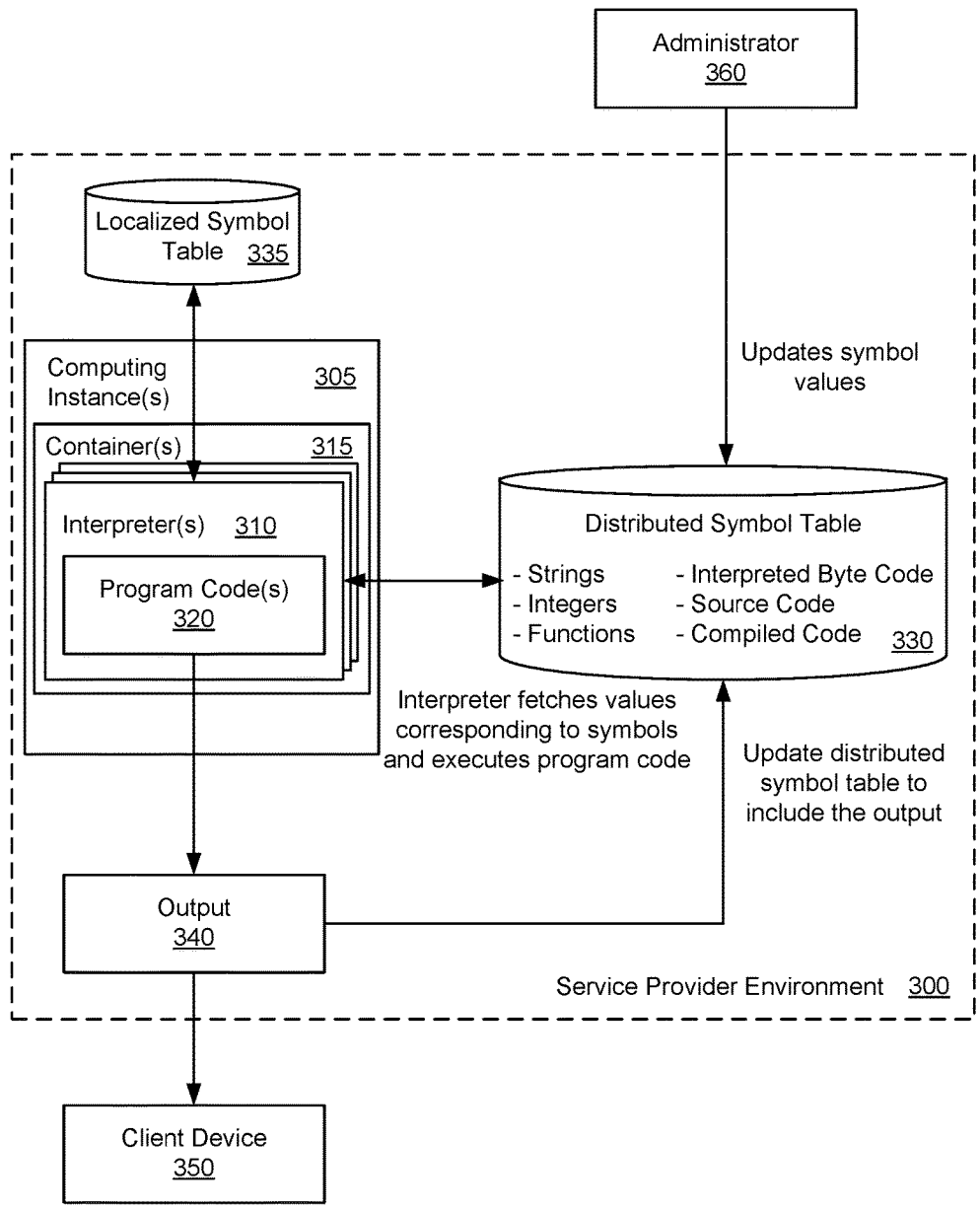
FIG. 3 illustrates a system and related operations for interpreting program code using a distributed symbol table according to an example of the present technology.

FIG. 3 illustrates an example of a system and related operations for interpreting program code 320 at an interpreter 310 in a service provider environment 300 using a distributed symbol table 330. The service provider environment 300 may run one or more computing instances 305 with one or more containers 315 that include the interpreter 310. The interpreter 310 may identify the program code 320 to be executed in the service provider environment 100. The program code 320 may be written in a wide variety of programming languages, such as LISP, Beginner's All-purpose Symbolic Instruction Code (BASIC), Java, C, C++, etc. The program code 320 may be executed in response to an occurrence of a predefined event (i.e., an event that triggers the execution of the program code 320). In addition, the distributed symbol table 330 may be accessible to a plurality of program codes 320 executing in the service provider environment 300.

During execution of the program code 320, the interpreter 310 may detect or encounter a symbol in the program code 320. The interpreter 310 may look up the symbol in the distributed symbol table 330, and fetch a value that corresponds to the symbol. The distributed symbol table 330 may include a plurality of symbols and corresponding values, and the interpreter 310 may have previously set or configured the symbols and corresponding values at the distributed symbol table 330. The symbols and corresponding values may be referred to as key-value pairs. For each symbol, the distributed symbol table 330 may store a string, a numeric value, a function, source code, interpreted byte code or compiled code. After the interpreter 310 locates a corresponding value for a given symbol in the distributed symbol table 330, the interpreter 310 may replace the symbol in the program code 320 with the value fetched from the distributed symbol table 330. The interpreter 310 may continue translating the program code 320 using the value fetched from the distributed symbol table 330, and the interpreter 310 may generate executable code.

As a non-limiting example, a primitive of 'define foo 10' may be used to store the value of '10' in the symbol 'foo'. In other words, in the distributed symbol table 330, a key-value pair may be generated for 'foo' and '10'. When the symbol 'foo' is used in an expression in the program code 320, the interpreter 310 may look up the value of the symbol 'foo' in the distributed symbol table 330, replace the symbol 'foo' with the value of '10', and then evaluate the expression. For example, when the interpreter 310 evaluates the expression (foo+2), the interpreter 310 may look up the symbol 'foo' in the distributed symbol table 330, replace the symbol 'foo' with the value of '10' retrieved from the distributed symbol table 330, and then evaluate the resulting expression of (10+2), which produces a result of '12'.

As another non-limiting example, the symbol 'square' may correspond to a function that calculates a square of a number. In the distributed symbol table 330, a key-value pair may be generated for 'square' and 'X*X', wherein 'square' refers the symbol and 'X*X' corresponds to a function that calculates a square of a number (e.g., an integer X). When the symbol 'square' is used in an expression in the program code 320, the interpreter 310 may look up the value of the symbol 'square' in the distributed symbol table 330, replace the symbol 'square' with the function of 'X*X', and then evaluate the expression. For example, when the interpreter 310 evaluates the expression (square, X=3), the interpreter 310 may look up the symbol 'square' in the distributed symbol table 330, replace the symbol 'square' with the value of 'X*X' retrieved from the distributed symbol table 330, and then evaluate the resulting expression of (3*3), which produces a result of '9'. In other words, the interpreter 310 may retrieve the function from the distributed symbol table 330 (i.e., a square function) and then execute the function with respect with a given value (e.g., 3) in order to produce the result of '9'.

In one configuration, the interpreter 310 may execute the program code 320 using values fetched from the distributed symbol table 330. As an example, the execution of the program code 320 may involve the performance of data analysis and processing (e.g., machine learning, pattern recognition, and predictive analysis), image processing, machine learning, encoding, etc. As another example, the execution of the program code 320 may involve a retrieval of weather information, a social media list, etc. from a server. In some cases, the interpreter 310 may generate an output 340 upon execution of the program code 320 in the service provider environment 300. The output 340 may include various types of information, such as data analysis, pattern analysis, weather patterns, statistics, etc. The output 340 may be provided for consumption at a client device 350.

In one configuration, the output 340 may be provided to the distributed symbol table 330. In other words, the distributed symbol table 330 may be updated to reflect the output 340 generated from the execution of the program code 320. In this example, the output 340 may be stored as a value (that corresponds to a symbol) in the distributed symbol table 330. By storing the output 340 in the distributed symbol table 330, the output 340 may be available to a plurality of other program codes 320 that access the distributed symbol table 330 during execution.

In another configuration, an administrator 360 may update one or more values in the distributed symbol table 330. For example, the administrator 360 may modify numeric values, strings, functions, etc. that correspond to certain symbols in the distributed symbol table 330. The updated values in the distributed symbol table 330 may be accessible to the plurality of program codes 320 that have access to the distributed symbol table 330. Therefore, rather than the administrator 360 manually updating the plurality of program codes 320 to reflect the updated values, the administrator 360 may modify the distributed symbol table 330 reflect the updated values, and the updated values may be automatically retrieved by the program codes 320 that are accessing the distributed symbol table 330.

In one example, the distributed symbol table 330 may enable a relatively large number of program codes 320 to simultaneously access values from the distributed symbol table 330, and a relatively large number of program codes 320 may be executed in parallel in the service provider environment 300. The service provider environment 300 may have the ability to dynamically add and remove computing instances 305 based on the number of program codes 320 that are being executed. Therefore, for program codes 320 that consume an increased amount of processing resources, memory resources, networking resources, etc., a load may be spread across a plurality of computing instances 305 in the service provider environment 300.

In one example, the distributed symbol table 330 may be initialized prior to execution of the program code 320 in the service provider environment 300. The initialization of the distributed symbol table 330 may ensure that symbols included in the program code 320 have corresponding values in the distributed symbol table 330. Otherwise, an error may be generated when the distributed symbol table 330 does not include a value that corresponds to a symbol in the program code 320. During the execution of the program code 320, when a value corresponding to a symbol in the program code 320 is looked up in the distributed symbol table 330 and not found, the execution of the program code 320 may be unsuccessful.

In one configuration, the distributed symbol table 330 may obtain key value pairs from other distributed symbol tables in the service provider environment 300. For example, a first distributed symbol table may include key-value pairs for a first type of program codes and a second distributed symbol table may include key-value pairs for a second type of program codes. If the first distributed symbol table desires the ability to process fetch requests from the second type of program codes, the first distributed symbol table may obtain the key-value pairs from the second distributed symbol table. Therefore, the service provider environment 300 may support the collaboration and sharing of information (e.g., key pairs) between multiple distributed symbol tables.

In one configuration, the program code 320 may retrieve values from a localized symbol table 335 in addition to the distributed symbol table 330. For example, the localized symbol table 335 may store values that are commonly retrieved by the program code 320. In other words, an amount of time to retrieve values from the distributed symbol table 330 may be greater than an amount of time to retrieve values from the localized symbol table 335, so therefore, the most commonly retrieved values may be stored in the localized symbol table 335 as opposed to the distributed symbol table 330. When the interpreter 310 encounters a symbol during an evaluation of the program code 320, the symbol may be denoted as a local symbol or a global symbol. For a local symbol, the interpreter 310 may fetch the corresponding value from the localized symbol table 335, and for a global symbol, the interpreter 310 may fetch the corresponding value from the distributed symbol table 330.

In one example, the distributed symbol table 330 may include stored procedures. The stored procedures may serve to perform calculations using the data stored in the distributed symbol table 330. Therefore, rather than the interpreter 310 executing functions to evaluate data stored on the distributed symbol table 330, the interpreter 310 may retrieve values from the distributed symbol table 330 that are derived from calculations performed at the distributed symbol table 330. For example, during execution of the program code 320, the interpreter may 310 may encounter a symbol titled 'mean'. The interpreter 310 may look up the symbol 'mean' in the distributed symbol table 330 and fetch a value that corresponds to the symbol 'mean'. However, at the distributed symbol table 330, the value corresponding to the symbol 'mean' may not be a static value. Rather, the distributed symbol table 330 may run a stored procedure that dynamically calculates a mean value for a data set that is stored in a database that is associated with the distributed symbol table 330, and this mean value may be stored as the value that corresponds to the symbol 'mean'. As the data set changes over time (e.g., additional data is added to the data set), the mean value for the data set may be updated by the distributed symbol table 330 in accordance with the stored procedure. Therefore, when the interpreter 310 fetches the value that corresponds to the symbol 'mean', a current mean value of the data set may be returned to the interpreter 310, and the interpreter 310 may continue evaluating the program code 320 using the value fetched from the distributed symbol table 330.

Figure 4:
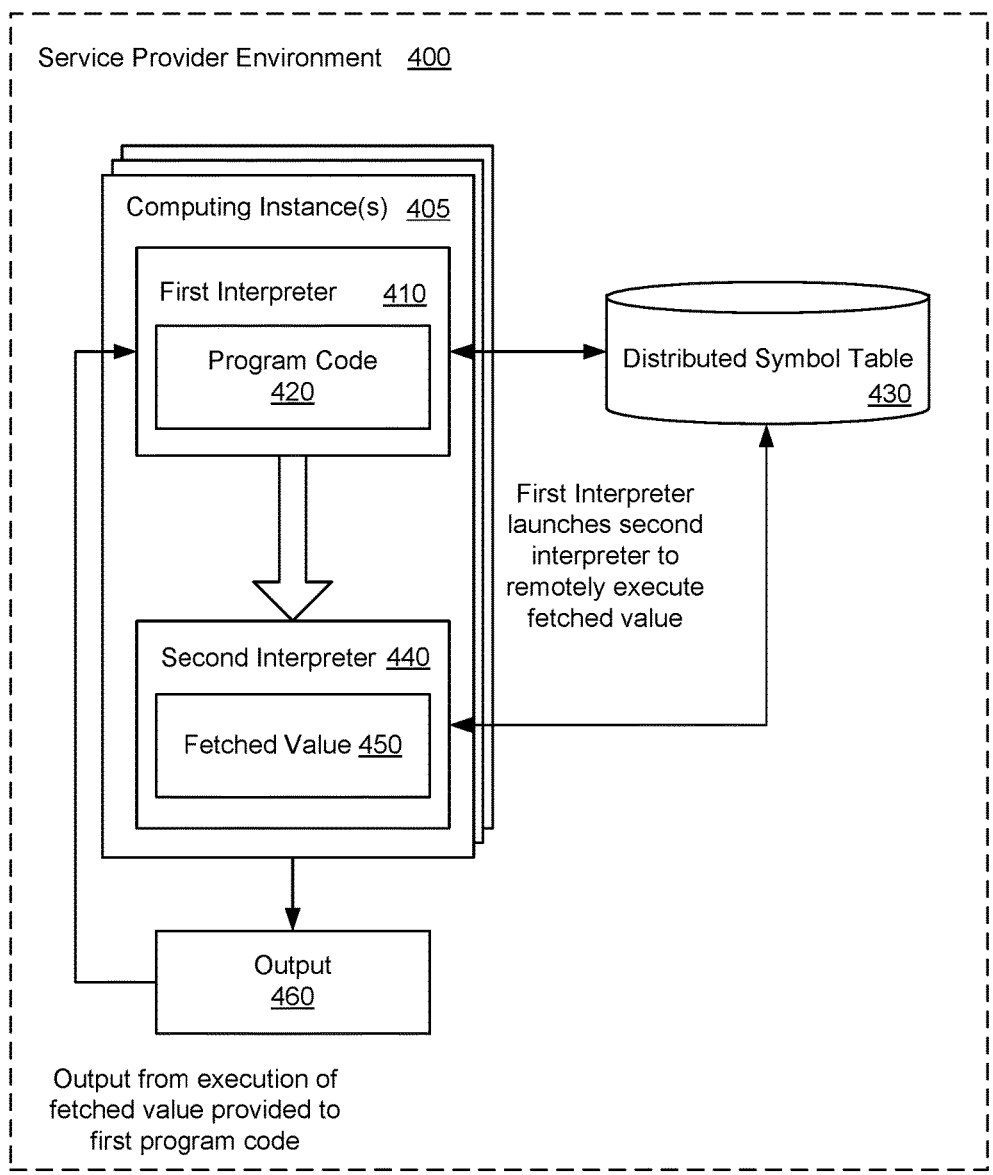
FIG. 4 illustrates a system and related operations for interpreting program code using multiple interpreters and a distributed symbol table according to an example of the present technology.

FIG. 4 illustrates an example of a system and related operations for interpreting program code 420 using multiple interpreters and a distributed symbol table 430 in a service provider environment 400. The service provider environment 400 may include a plurality of computing instances 405. A first interpreter 410 may run on one of the computing instances 405. The first interpreter 410 may execute (or evaluate) the program code 420. During the execution of the program code 420, the first interpreter 410 may detect a symbol in the program code 420, and then access the distributed symbol table 430 to fetch a value corresponding to the symbol in the program code 420.

In one configuration, rather than evaluating the value fetched from the distributed symbol table 430 at the first interpreter 410, the first interpreter 410 may launch a second interpreter 440 in the service provider environment 400 to remotely evaluate a fetched value 450 from the distributed symbol table 430. The second interpreter 440 may run on the one or more computing instances 405. The second interpreter 440 may be launched in accordance with an instruction included in the program code 420. The second interpreter 440 may have access to the distributed symbol table 430. However, when accessing values from the distributed symbol table 430, the second interpreter 440 may have a permission level for accessing values or symbols that is different as compared to the first interpreter 410. The second interpreter 440 may evaluate the fetched value 450 and produce an output 460, and the output 460 may be returned to the first interpreter 410.

In this configuration, the first interpreter 410 may perform a remote evaluation (or remote 'eval') since the evaluation of the fetched value 450 is performed remotely (e.g., using the second interpreter 440). Here, the fetched value 450 may be evaluated remotely, as opposed to a local evaluation (or local 'eval') in which the fetched value 450 from the distributed symbol table 430 is evaluated locally at the first interpreter 410.

As an example, the value fetched from the distributed symbol table 430 may be a function to perform facial recognition on an image. Rather than the first interpreter 410 evaluating the function, the first interpreter 410 may launch the second interpreter 440 to evaluate the function. The second interpreter 440 may identify a user associated with the image upon performing the facial recognition function, and the second interpreter 440 may provide an indication of the user name or identity to the first interpreter 410. The first interpreter 410 may utilize this information (e.g., the indication of the user identity) accordingly. Therefore, the first interpreter 410 may not evaluate each function itself, but rather may launch additional interpreters to perform the function and return a result to the first interpreter 410.

In one configuration, four primitives may be utilized for evaluation of the program code 420. A first primitive may be 'define' or 'store', and this may be used to store a value for a corresponding symbol in the distributed symbol table 430. A second primitive may be 'reference', and this may be used to retrieve a value for a given symbol from the distributed symbol table 430. A third primitive may be 'evaluate', and this may be used to evaluate a value (e.g., a function) fetched from the distributed symbol table 430. For example, the value may be locally evaluated using a first interpreter 410. A fourth primitive may be 'remote evaluate', and this may be used to remotely evaluate a value fetched from the distributed symbol table 430. For example, the value may be remotely evaluated using a second interpreter 440 that is launched in the service provider environment 400.

Figure 5:
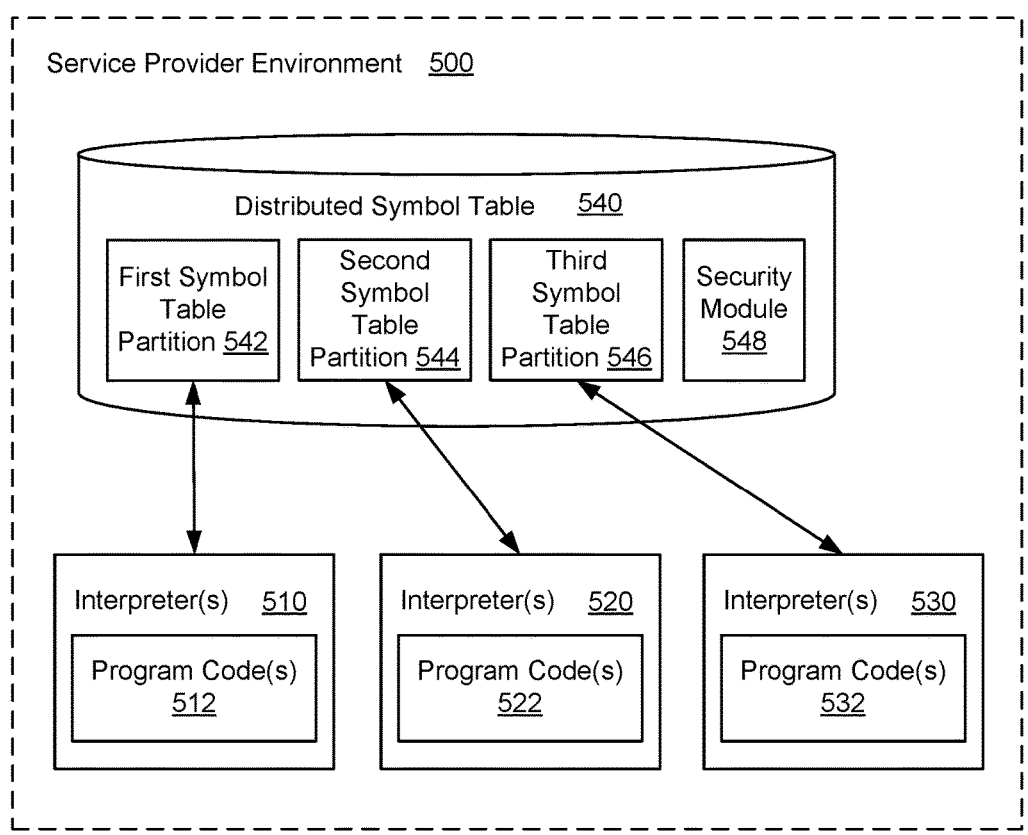
FIG. 5 illustrates a partitioning of a distributed symbol table according to an example of the present technology.

FIG. 5 illustrates an example of a partitioning of a distributed symbol table 540 in a service provider environment 500. The distributed symbol table 540 may be partitioned into a plurality of partitions, such as a first symbol table partition 542, a second symbol table partition 544, and a third symbol table partition 546. Each partition in the distributed symbol table 540 may include a plurality of symbol-value pairs. The values may include strings, numeric values, functions, source code, interpreted byte code, compiled code, etc.

The service provider environment 500 may include a plurality of interpreters that execute program code. For example, the service provider environment 500 may include a first interpreter 510 that executes a first program code 512, a second interpreter 520 that executes a second program code 522, and a third interpreter 530 that executes a third program code 532. During execution of the program codes, the interpreters may retrieve values from the distributed symbol table 540.

In one example, an identity and access management (IAM) scheme may be utilized by a security module 548 to restrict access to certain partitions of the distributed symbol table 540. For example, the security module 548 may limit access to certain partitions of the distributed symbol table 540 to certain clients (e.g., interpreters, program codes, users, and applications). The clients may be assigned respective permission levels, which may govern which partitions of the distributed symbol table 540 are accessible to each client. As a result, the distributed symbol table 540 may be accessible and shared among a plurality of clients in the service provider environment 500, but not all partitions of the distributed symbol table 540 may be available to all clients.

As a non-limiting example, a first interpreter 510 may be provided access to a first symbol table partition 542 based on a respective permission level, a second interpreter 520 may be provided access to a second symbol table partition 544 based on a respective permission level, and a third interpreter 530 may be provided access to a third symbol table partition 542 based on a respective permission level.

In another example, the interpreters may be provided access to one or more symbol table partitions based on their respective permission levels. For example, the first interpreter 510 may be provided access to the first symbol table partition 542 in the distributed symbol table 540, the second interpreter 520 may be provided access to the first and second symbol table partitions 542, 544 in the distributed symbol table 540, and the third interpreter 530 may be provided access to the second and third symbol table partitions 544, 546 in the distributed symbol table 540.

In yet another example, the interpreters may be provided with read and/or write access to certain symbol table partitions or sub-partitions in the distributed symbol table. In addition, the permissions may be in accordance with a per-symbol granularity level or smaller symbol group granularity. For example, based on appropriate permission levels, the first interpreter 510 may have access to a first symbol included in the distributed symbol table 540, the second interpreter 510 may have access to the first symbol and a second symbol included in the distributed symbol table 540, and so on.

Figure 6:
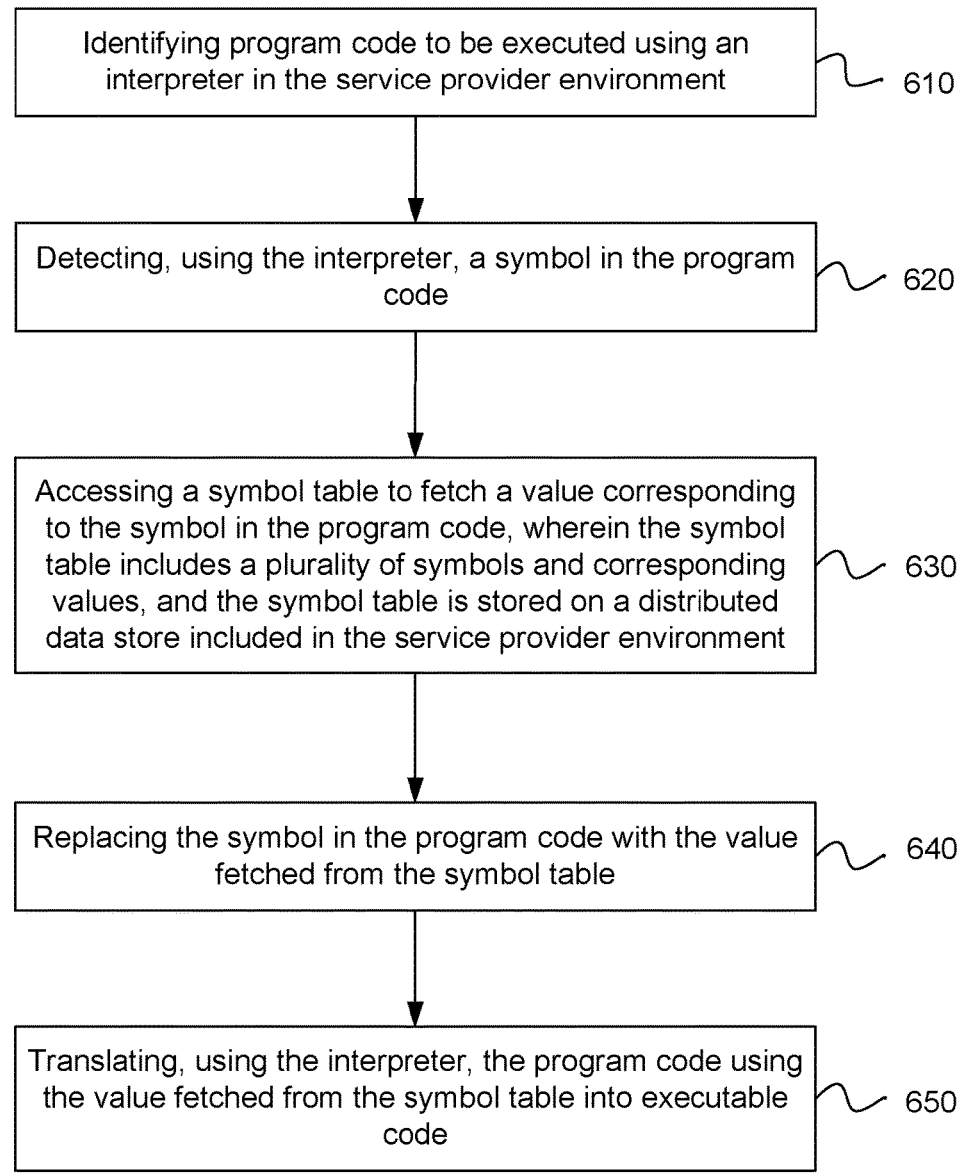
FIG. 6 is a flowchart of an example method for executing program code in a service provider environment.

FIG. 6 illustrates an example of a method for interpreting program code in a service provider environment. An interpreter may identify program code to be executed in the service provider environment, as in block 610. The interpreter may directly execute instructions (e.g., source code) in a programming or scripting language, without previously compiling the instructions into a machine language program. For example, the interpreter may parse the instructions and directly perform an associated behavior, or the interpreter may translate the instructions into an intermediate representation and then execute the intermediate representation.

A symbol in the program code may be detected at the interpreter, as in block 620. The interpreter may analyze each statement in the program code one at a time and then perform an associated action. During an analysis of a given statement, the interpreter may detect the symbol in the program code.

A symbol table may be accessed to fetch a value corresponding to the symbol in the program code, as in block 630. The value fetched from the symbol table includes a string, an integer or a function. The symbol table may include a plurality of symbols and corresponding values. The symbol table may be stored on a distributed data store included in the service provider environment.

The symbol in the program code may be replaced with the value fetched from the symbol table, as in block 640. In other words, the symbol in the program code may be replaced with the string, an integer or function that is fetched from the symbol table.

The program code may be translated, via the interpreter, using the value fetched from the symbol table to executable code, as in block 650. The interpreter may run the executable code, and in one example, the interpreter may generate an output upon executing the program code in the service provider environment. In another example, the execution of the program code may result in the performance of a desired action in the service provider environment.

In one example, permissions may be set for the symbol table such that the symbol table may be accessible to a plurality of interpreters executing program code in the service provider environment. The interpreters may each be permitted to access selected portions of the symbol table based on respective permissions settings. In another example, the symbol table may be updated to include an output obtained from execution of the program code. The output may be retrievable to other program codes executing in the service provider environment.

Figure 7:
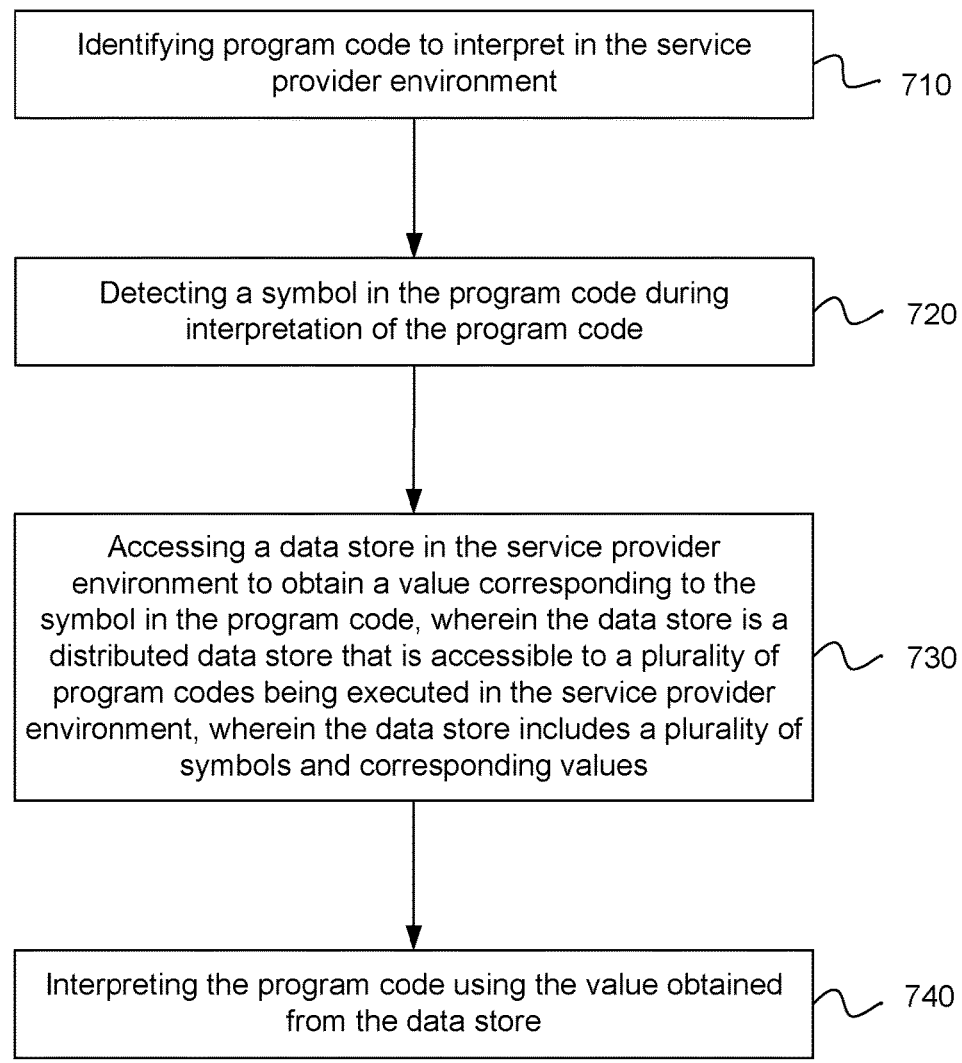
FIG. 7 is a flowchart of another example method for executing program code in a service provider environment.

FIG. 7 illustrates an example of a method for executing program code in a service provider environment. Program code to be interpreted in the service provider environment may be identified, as in block 710. For example, program code may be interpreted using an interpreter that operates in the service provider environment. The interpreter may directly execute instructions (e.g., source code) in a programming or scripting language, without previously compiling the instructions into a machine language program.

A symbol may be detected in the program code during interpretation of the program code, as in block 720. For example, an interpreter may analyze each statement in the program code one at a time and then perform an associated action. During an analysis of a given statement, the interpreter may detect the symbol in the program code.

A data store in the service provider environment may be accessed to fetch or obtain a value corresponding to the symbol in the program code, as in block 730. The value fetched from the data store may include source code, interpreted byte code or compiled code. The data store may include a plurality of symbols and corresponding values in a symbol table, and the plurality of symbols and corresponding values may be configured or set in whole or in part using the interpreter that interprets the program code. The data store may be a distributed data store that is accessible to a plurality of program codes being executed in the service provider environment, and the distributed data store may be shared among the plurality of program codes. The data store may be distributed, such that the data store may be duplicated onto multiple nodes in the service provider environment, and each data store may store a copy of at least a portion of the symbol table.

The program code may be interpreted using the value fetched or obtained from the data store, as in block 740. The program code may be executed using the interpreter that operates in the service provider environment. In one example, the execution of the program code may result in a desired action being performed in the service provider environment. In another example, the execution of the program code may produce an output (e.g., analytics information).

In one example, the value fetched from the data store may be periodically modified by the data store in accordance with a stored procedure that runs in the data store. In another example, values corresponding to symbols in the program code may be fetched from a local data store in addition to the data store in the service provider environment. In yet another example, the data store may be initialized prior to execution of the program code in the service provider environment.

In one example, the data store may be partitioned into one or more sections. Permission levels may be assigned to the one or more sections and a plurality of program codes being executed in the service provider environment. The permission levels may enable the program codes to access the one or more sections of the data store.

In one example, a second interpreter may be launched in the service provider environment to remotely execute the value fetched from the data store. The second interpreter may be launched in accordance with an instruction included in the program code. The second interpreter may generate an output upon the execution of the value, and the second interpreter may return the output.

In one example, values in the data store may be updated based on instructions received from an operator, and the updated values may be retrievable to other program codes executing in the service provider environment. In another example, an error may be generated when the data store does not include a value that corresponds to the symbol in the program code. In yet another example, the program code may be executed when an occurrence of a predefined event triggers execution of the program code.

Figure 8:
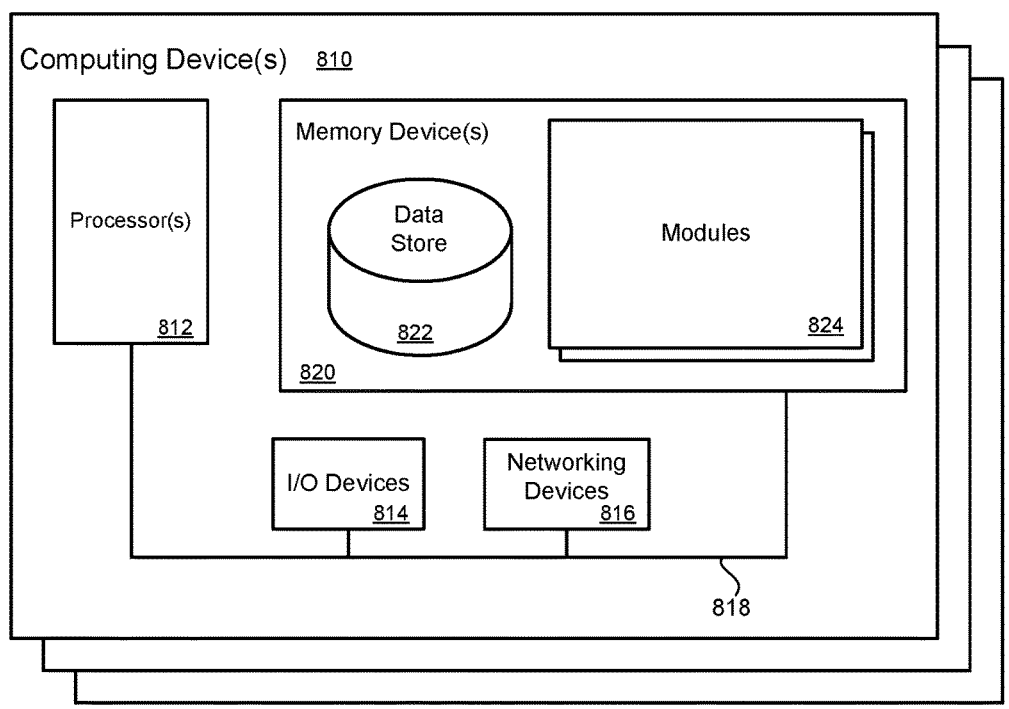
FIG. 8 is a block diagram that provides an example illustration of a computing device that may be employed in the present technology.

FIG. 8 illustrates a computing device 810 on which modules of this technology may execute. A computing device 810 is illustrated on which a high level example of the technology may be executed. The computing device 810 may include one or more processors 812 that are in communication with memory devices 820. The computing device may include a local communication interface 818 for the components in the computing device. For example, the local communication interface may be a local data bus and/or any related address or control busses as may be desired.

The memory device 820 may contain modules 824 that are executable by the processor(s) 812 and data for the modules 824. The modules 824 may execute the functions described earlier. A data store 822 may also be located in the memory device 820 for storing data related to the modules 824 and other applications along with an operating system that is executable by the processor(s) 812.

Other applications may also be stored in the memory device 820 and may be executable by the processor(s) 812. Components or modules discussed in this description that may be implemented in the form of software using high programming level languages that are compiled, interpreted or executed using a hybrid of the methods.

The computing device may also have access to I/O (input/output) devices 814 that are usable by the computing devices. An example of an I/O device is a display screen that is available to display output from the computing devices. Other known I/O device may be used with the computing device as desired. Networking devices 816 and similar communication devices may be included in the computing device. The networking devices 816 may be wired or wireless networking devices that connect to the internet, a LAN, WAN, or other computing network.

The components or modules that are shown as being stored in the memory device 820 may be executed by the processor 812. The term "executable" may mean a program file that is in a form that may be executed by a processor 812. For example, a program in a higher level language may be compiled into machine code in a format that may be loaded into a random access portion of the memory device 820 and executed by the processor 812, or source code may be loaded by another executable program and interpreted to generate instructions in a random access portion of the memory to be executed by a processor. The executable program may be stored in any portion or component of the memory device 820. For example, the memory device 820 may be random access memory (RAM), read only memory (ROM), flash memory, a solid state drive, memory card, a hard drive, optical disk, floppy disk, magnetic tape, or any other memory components.

The processor 812 may represent multiple processors and the memory 820 may represent multiple memory units that operate in parallel to the processing circuits. This may provide parallel processing channels for the processes and data in the system. The local interface 818 may be used as a network to facilitate communication between any of the multiple processors and multiple memories. The local interface 818 may use additional systems designed for coordinating communication such as load balancing, bulk data transfer, and similar systems.

Figure 9:
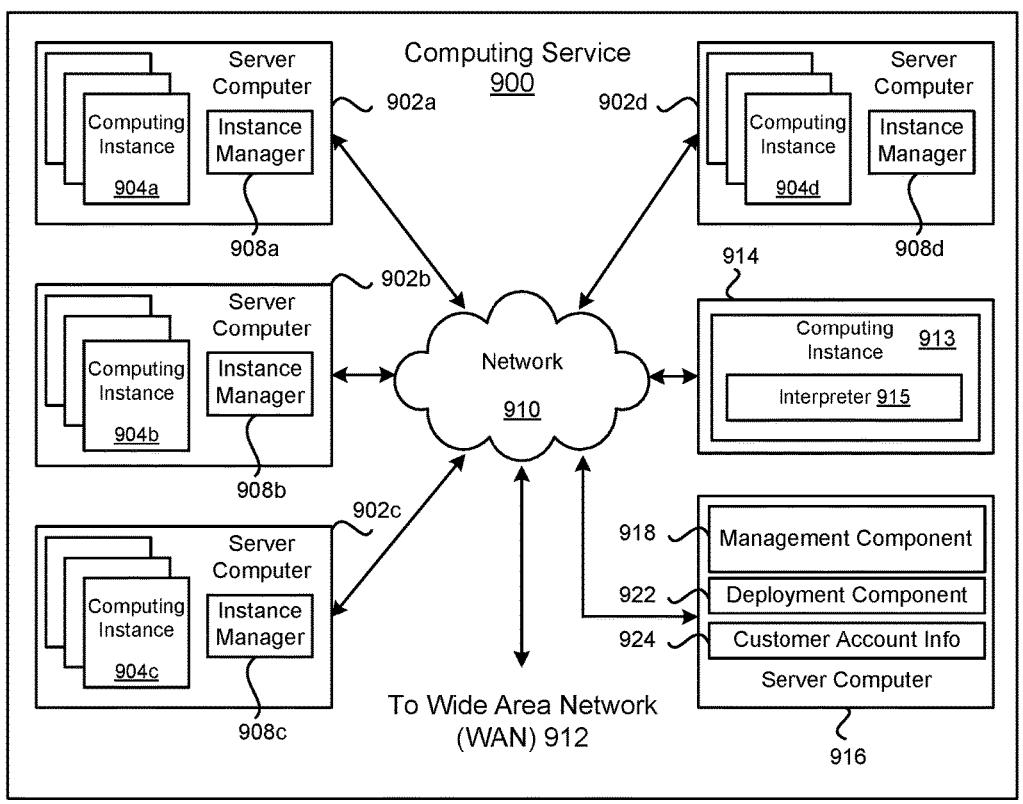
FIG. 9 is a block diagram of a service provider environment according to an example of the present technology.

FIG. 9 is a block diagram illustrating an example computing service 900 that may be used to execute and manage a number of computing instances 904a-d upon which the present technology may execute. In particular, the computing service 900 depicted illustrates one environment in which the technology described herein may be used. The computing service 900 may be one type of environment that includes various virtualized service resources that may be used, for instance, to host computing instances 904a-d.

The computing service 900 may be capable of delivery of computing, storage and networking capacity as a software service to a community of end recipients. In one example, the computing service 900 may be established for an organization by or on behalf of the organization. That is, the computing service 900 may offer a "private cloud environment." In another example, the computing service 900 may support a multi-tenant environment, wherein a plurality of customers may operate independently (i.e., a public cloud environment). Generally speaking, the computing service 900 may provide the following models: Infrastructure as a Service ("IaaS"), Platform as a Service ("PaaS"), and/or Software as a Service ("SaaS"). Other models may be provided. For the IaaS model, the computing service 900 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 900. End customers may access the computing service 900 using networked client devices, such as desktop computers, laptops, tablets, smartphones, etc. running web browsers or other lightweight client applications, for example. Those familiar with the art will recognize that the computing service 900 may be described as a "cloud" environment.

The particularly illustrated computing service 900 may include a plurality of server computers 902a-d. The server computers 902a-d may also be known as physical hosts. While four server computers are shown, any number may be used, and large data centers may include thousands of server computers. The computing service 900 may provide computing resources for executing computing instances 904a-d. Computing instances 904a-d may, for example, be virtual machines. A virtual machine may be an instance of a software implementation of a machine (i.e. a computer) that executes applications like a physical machine. In the example of a virtual machine, each of the server computers 902a-d may be configured to execute an instance manager 908a-d capable of executing the instances. The instance manager 908a-d may be a hypervisor, virtual machine manager (VMM), or another type of program configured to enable the execution of multiple computing instances 904a-d on a single server. Additionally, each of the computing instances 904a-d may be configured to execute one or more applications.

A server 914 may be reserved to execute software components for implementing the present technology or managing the operation of the computing service 900 and the computing instances 904a-d. For example, the server computer 914 may run a computing instance 913 that operates an interpreter 915 for executing program code in the computing service 900. The interpreter 915 may identify program code to be executed in the computing service 900. The interpreter may detect a symbol in the program code during execution of the program code. The interpreter may access a symbol table to fetch a value corresponding to the symbol in the program code. The symbol table may include a plurality of symbols and corresponding values. The symbol table may be accessed from a distributed data store included in the computing service 900. The interpreter 915 may replace the symbol in the program code with the value fetched from the symbol table. The interpreter 915 may translate the program code using the value fetched from the symbol table to executable code.

A server computer 916 may execute a management component 918. A customer may access the management component 918 to configure various aspects of the operation of the computing instances 904a-d purchased by a customer. For example, the customer may setup computing instances 904a-d and make changes to the configuration of the computing instances 904a-d.

A deployment component 922 may be used to assist customers in the deployment of computing instances 904a-d. The deployment component 922 may have access to account information associated with the computing instances 904a-d, such as the name of an owner of the account, credit card information, country of the owner, etc. The deployment component 922 may receive a configuration from a customer that includes data describing how computing instances 904a-d may be configured. For example, the configuration may include an operating system, provide one or more applications to be installed in computing instances 904a-d, provide scripts and/or other types of code to be executed for configuring computing instances 904a-d, provide cache logic specifying how an application cache is to be prepared, and other types of information. The deployment component 922 may utilize the customer-provided configuration and cache logic to configure, prime, and launch computing instances 904a-d. The configuration, cache logic, and other information may be specified by a customer accessing the management component 918 or by providing this information directly to the deployment component 922.

Customer account information 924 may include any desired information associated with a customer of the multi-tenant environment. For example, the customer account information may include a unique identifier for a customer, a customer address, billing information, licensing information, customization parameters for launching instances, scheduling information, etc. As described above, the customer account information 924 may also include security information used in encryption of asynchronous responses to API requests. By "asynchronous" it is meant that the API response may be made at any time after the initial request and with a different network connection.

A network 910 may be utilized to interconnect the computing service 900 and the server computers 902*a-d*, 916. The network 910 may be a local area network (LAN) and may be connected to a Wide Area Network (WAN) 912 or the Internet, so that end customers may access the computing service 900. In addition, the network 910 may include a virtual network overlaid on the physical network to provide communications between the servers 902*a-d*. The network topology illustrated in FIG. 9 has been simplified, as many more networks and networking devices may be utilized to interconnect the various computing systems disclosed herein.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A method for interpreting program code in a service provider environment, the method comprising:
   identifying program code to be executed using an interpreter in the service provider environment;
   detecting, using the interpreter, a symbol in the program code;
   accessing, at the interpreter, a symbol table to fetch a value corresponding to the symbol in the program code, wherein the symbol table includes a plurality of symbols and corresponding values, and the symbol table is stored on a distributed data store included in the service provider environment;

replacing the symbol in the program code with the value fetched from the symbol table;

translating, using the interpreter, the program code using the value fetched from the symbol table into executable code; and updating the symbol table to include an output generated from execution of the program code, wherein the output is retrievable to other program codes executing in the service provider environment.

2. The method of claim 1, further comprising generating the output when the program code is executing in the service provider environment, and the output is provided to a client for consumption.

3. The method of claim 1, further comprising setting permissions for the symbol table such that the symbol table is accessible to a plurality of interpreters executing program code in the service provider environment, wherein the interpreters are each permitted to access defined portions of the symbol table based on respective permissions settings.

4. The method of claim 1, wherein the value fetched from the symbol table includes a string, a numeric value, a function, source code, interpreted byte code or compiled code.

5. A method, comprising:
identifying program code to interpret in a service provider environment;

detecting a symbol in the program code during interpretation of the program code;

accessing a data store in the service provider environment to obtain a value corresponding to the symbol in the program code, wherein the data store is a distributed data store that is accessible to a plurality of program codes being executed in the service provider environment, wherein the data store includes a symbol table with a plurality of symbols and corresponding values;

interpreting the program code using the value obtained from the data store, wherein the symbol is replaced with the value obtained from the data store; and updating the symbol table to include an output generated from execution of the program code, wherein the output is retrievable to other program codes executing in the service provider environment.

6. The method of claim 5, further comprising executing the program code using an interpreter that runs in the service provider environment.

7. The method of claim 5, further comprising configuring a plurality of symbols and corresponding values in the data store using an interpreter that interprets the program code.

8. The method of claim 5, wherein the value obtained from the data store is periodically modified by the data store in accordance with a stored procedure that runs in the data store.

9. The method of claim 5, further comprising:
partitioning the data store into sections; and
assigning permission levels to the sections and a plurality of program codes being executed in the service provider environment, wherein the permission levels enable the program codes to access the sections of the data store.

10. The method of claim 5, further comprising:
launching an additional interpreter in the service provider environment to remotely execute the value obtained from the data store, wherein the additional interpreter is launched in accordance with an instruction included in the program code; and receiving an additional output at the program code upon execution of the value at the additional interpreter.

11. The method of claim 5, further comprising obtaining values corresponding to symbols in the program code from a local data store in addition to the data store in the service provider environment.

12. The method of claim 5, further comprising updating values in the data store based on instructions received from an administrator, wherein the updated values are retrievable by other program codes executing in the service provider environment.

13. The method of claim 5, further comprising initializing the data store prior to execution of the program code in the service provider environment.

14. The method of claim 5, wherein the value obtained from the data store includes a string, a numeric value, a function, source code, interpreted byte code or compiled code.

15. The method of claim 5, further comprising generating an error when the data store does not include a value that corresponds to the symbol in the program code.

16. The method of claim 5, further comprising executing the program code when an occurrence of a predefined event triggers execution of the program code.

17. A system, comprising:
a processor;
a memory device including a data store to store a plurality of data and instructions that, when executed by the processor, cause the processor to:
identify program code to be executed using an interpreter in a service provider environment;
detect a symbol in the program code during execution of the program code;
access, at the interpreter, a symbol table to fetch a value corresponding to the symbol in the program code,
wherein the symbol table includes a plurality of symbols and corresponding values, and the symbol table is accessed from a distributed data store included in the service provider environment;
replace the symbol in the program code with the value fetched from the symbol table;
translate the program code using the value fetched from the symbol table into executable code; and
update the symbol table to include an output generated from execution of the program code,
wherein the output is retrievable to other program codes executing in the service provider environment.

18. The system of claim 17, wherein the plurality of data and instructions, when executed by the processor, cause the processor to launch a second interpreter in the service provider environment to remotely execute the value fetched from the symbol table, wherein the second interpreter is launched in accordance with an instruction included in the program code.

19. The system of claim 17, wherein the value fetched from the symbol table includes a string, a numeric value, a function, source code, interpreted byte code or compiled code.

* * * * *